US011879523B1

United States Patent
Prölss

(10) Patent No.: US 11,879,523 B1
(45) Date of Patent: Jan. 23, 2024

(54) PLANETARY GEAR ARRANGEMENT AND JOURNAL PIN FOR SUPPORTING GEAR

(71) Applicant: Rolls-Royce Deutschland Ltd & Co KG, Blankenfelde-Mahlow (DE)

(72) Inventor: Maximilian Prölss, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/888,842

(22) Filed: Aug. 16, 2022

(51) Int. Cl.
| | | |
|---|---|---|
| *F16H 57/08* | (2006.01) | |
| *F02C 7/36* | (2006.01) | |
| *F16H 57/04* | (2010.01) | |

(52) U.S. Cl.
CPC ........... *F16H 57/08* (2013.01); *F02C 7/36* (2013.01); *F16H 57/043* (2013.01); *F16H 57/0467* (2013.01); *F05D 2260/40311* (2013.01)

(58) Field of Classification Search
CPC ........... F02C 7/36; F05D 2260/40311; F05D 2220/323; F16H 57/04; F16H 57/08; F16H 57/0471; F16H 57/043; F16H 57/0467; F16H 1/28; F16H 2057/085; F15C 33/10; F01D 15/12; F16C 7/02; F16C 2361/65
See application file for complete search history.

(56) References Cited

U.S. PATENT DOCUMENTS

| | | | | |
|---|---|---|---|---|
| 3,754,484 A * | 8/1973 | Roberts | ............ | F16H 1/28 475/346 |
| 5,885,005 A * | 3/1999 | Nakano | ............ | G11B 25/043 315/133 |
| 8,657,714 B1 * | 2/2014 | Ghanime | ............ | F16C 33/1065 384/380 |
| 2011/0092330 A1 * | 4/2011 | Nishida | ............ | F03D 80/70 475/159 |
| 2014/0169712 A1 * | 6/2014 | Suzuki | ............ | F16C 33/105 384/289 |

FOREIGN PATENT DOCUMENTS

CA        2987167 A1 *    6/2018    ............ F16C 17/02

OTHER PUBLICATIONS

Meyer, Thomas, "Radial Slide Bearing With Offset Lubricating Pockets", Nov. 16, 2016, EP-3093514-A1 (Year: 2016).*
Makino, Takero, "Journal Bearing", Dec. 5, 2000, JP-2000337360 A (Year: 2000).*

* cited by examiner

*Primary Examiner* — Sabbir Hasan
*Assistant Examiner* — Joshua R Beebe
(74) *Attorney, Agent, or Firm* — SHUTTLEWORTH & INGERSOLL, PLC; Timothy J. Klima

(57) ABSTRACT

A planetary gear arrangement including a sun gear configured to rotate about an axis of rotation, a plurality of planet gears driven by the sun gear, a ring gear engaged with the plurality of planet gears and a plurality of journal pins arranged in the plurality of planet gears forming a converging gap and a diverging gap therebetween. Each journal pin has at least one longitudinal groove along an outer surface thereof, configured to guide oil on the outer surface when the oil is carried from the converging gap towards the diverging gap due to a revolving movement between a planet gear around a corresponding journal pin. A journal pin for supporting a gear and a gas turbine engine.

20 Claims, 4 Drawing Sheets

PLANETARY GEAR ARRANGEMENT AND JOURNAL PIN FOR SUPPORTING GEAR

TECHNICAL FIELD

The present disclosure relates generally to gear arrangement; more specifically, the present disclosure relates to a planetary gear arrangement. Moreover, the present disclosure relates to an journal pin for supporting gear. Furthermore, the present disclosure also relates to a gas turbine engine for an aircraft.

BACKGROUND

Generally, jet engines are the internal-combustion engines that propel aircraft by means of the rearward discharge of a jet of fluid accelerated by a fan. Typically, the jet engines have a planetary gear arrangement that includes a sun gear, planet gears, ring gear, carrier, and cylindrical pins and that is operatively connected to the fan.

Conventionally, a lubricant is provided between the cylindrical pins and planet gears in a clearance region for lubrication thereof. The lubricants are used to carry the load, reduce friction, wear-tear, and carry away the heat generated between the cylindrical pins and planet gears. Typically, the cylindrical pins and planet gears form a journal bearing. Notably, the lubricant used in the journal bearings reduces friction, heat and increases the load-bearing capacity of the planetary gear arrangement. Moreover, the lubricants may be any fluid, usually a mineral oil, synthetic oil, semi-synthetic oil or grease. When the planet gears rotate the lubricant develops a pressure gradient and heats up thereby increasing the temperature therebetween. In order to overcome the increase in temperature a cold oil is provided within the journal bearing.

Typically, the minimum gap is expected at a circular angle between 170° and 210° at bottom dead center (BDC) of the circular pins. However, the rise in temperature reaches maximum, after the minimum gap. Notably, the rise in temperature increases the frictional loss, and particle contamination due to wear and tear which occurs due to metal-to-metal contacts between the cylindrical pins and planet gears and thereby affecting the efficiency of the planetary gear arrangement. Moreover, the hot oil carried due to the rotation from the BDC to the top dead center (TDC) is mixed with cold oil and is again supplied between the cylindrical pins and planet gears. In this regard, the cold oil also gets concentrated and the hot oil does not leave the journal bearing, but is condensed in the middle and further increasing the temperature of the journal bearing. In consequence, the current planetary gear arrangement has no features to displace the hot oil after the minimum gap and to avoid mixing the hot oil with the cold oil. In addition, the heat management becomes difficult that further leads to higher frictional loss, and susceptibility to particle contaminations within the planet gear arrangement.

Therefore, to ameliorate the technical problems encountered with known planetary gear arrangement, there exists a need to provide an improved planetary gear arrangement that is more effective when in operation.

SUMMARY

The present disclosure seeks to provide an improved planetary gear arrangement. The present disclosure also seeks to provide an improved journal pin for supporting a gear. The present disclosure also seeks to provide an improved gas turbine engine for an aircraft. The present disclosure seeks to provide a solution to the existing problem by providing a helical groove in the journal pin that can be used to guide the hot oil thereby improving heat management and consequently the load capability. An aim of the present disclosure is to provide a solution that overcomes, at least partially, the aforementioned problems encountered in prior art, and to provide a planetary gear arrangement which improves the heat management, is more efficient and provides a higher structural rigidity.

In a first aspect, the present disclosure provides a planetary gear arrangement comprising:
  a sun gear configured to rotate about an axis of rotation of the planetary gear arrangement and defines an axial direction of the planetary gear arrangement;
  a plurality of planet gears driven by the sun gear;
  a ring gear engaged with the plurality of planet gears; and
  a plurality of journal pins, wherein the plurality of journal pins are arranged in the plurality of planet gears forming a converging gap and a diverging gap therebetween, wherein each journal pin is having at least one longitudinal groove along an outer surface thereof, and wherein the at least one longitudinal groove is configured to guide oil on the outer surface of the journal pin when the oil is carried from the converging gap towards the diverging gap due to a rotary movement between a planet gear around a corresponding journal pin.

More optionally, each of the plurality of journal pins is elliptical in shape.

Optionally, the at least one longitudinal groove is a continuous groove running along the outer surface from a proximal end to a distal end of the journal pin.

Optionally, the at least one longitudinal groove comprises a plurality of grooves configured in a spaced apart manner along the outer surface from a proximal end to a distal end of the journal pin.

Optionally, the at least one longitudinal groove is configured on a non-load bearing portion of the outer surface of the journal pin.

Optionally, the at least one longitudinal groove is operable to avoid mixing of the hot oil in the converging gap with the cold oil of the diverging gap.

In a second aspect, the present disclosure provides an journal pin for supporting a gear, the journal pin comprising:
  a longitudinal axis and
  an outside contact surface,
wherein the journal pin is arranged in the gear forming a converging gap and a diverging gap therebetween, wherein the journal pin has at least one longitudinal groove along an outer surface thereof, and wherein the at least one longitudinal groove is configured to guide oil on the outer surface of the journal pin when the oil is carried from the converging gap towards the diverging gap due to a rotary movement between the gear around the journal pin.

In a third aspect, the present disclosure provides a gas turbine engine for an aircraft, comprising:
  an engine core having a turbine, a compressor and a turbine shaft connecting the turbine to the compressor;
  a fan positioned upstream of the engine core, the fan having a plurality of fan blades and a fan shaft; and
  a planetary gear including a journal pin according to the second aspect, for receiving input from the turbine shaft and provide output to the fan shaft.

Embodiments of the present disclosure substantially eliminate or at least partially address the aforementioned problems in the prior art, and provides a planetary gear arrangement having a plurality of journal pins to carry load and provides structural rigidity.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, byway of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with a planetary gear. The embodiments of the present disclosure are also concerned with a journal pin for supporting a gear. The embodiments of the present disclosure are also concerned with a gas turbine engine for an aircraft.

The planetary gear arrangement, having the plurality of journal pins, performs a plurality of functions: connects the centers of the plurality of planet gears and rotates the plurality of planet gears to have a meshing without any slip. The plurality of journal pins have longitudinal grooves configured to guide the oil on the outer surface of the journal pin when the oil is carried from the converging gap towards the diverging gap due to a rotary movement between a planet gear around a corresponding journal pin. The guiding of the oil enables to manage the heat generated during the rotation of the plurality of the planet gars.

As aforementioned, the present disclosure provides a journal pin that have longitudinal grooves. Notably, the longitudinal groves prevent mixing of the hot used oil with the fresh cold oil thereby reducing temperature. Hence the journal bearing robustness increases protecting the integrity of the coating and reduces the risk for thermal seizures. It will be appreciated that the improved heat management consequently improves the load bearing capability of the journal bearing. Moreover, the guiding of the oil out of the diverging gap reduces the amount of oil and also increases the efficiency of the planetary arrangement.

Figure 1:
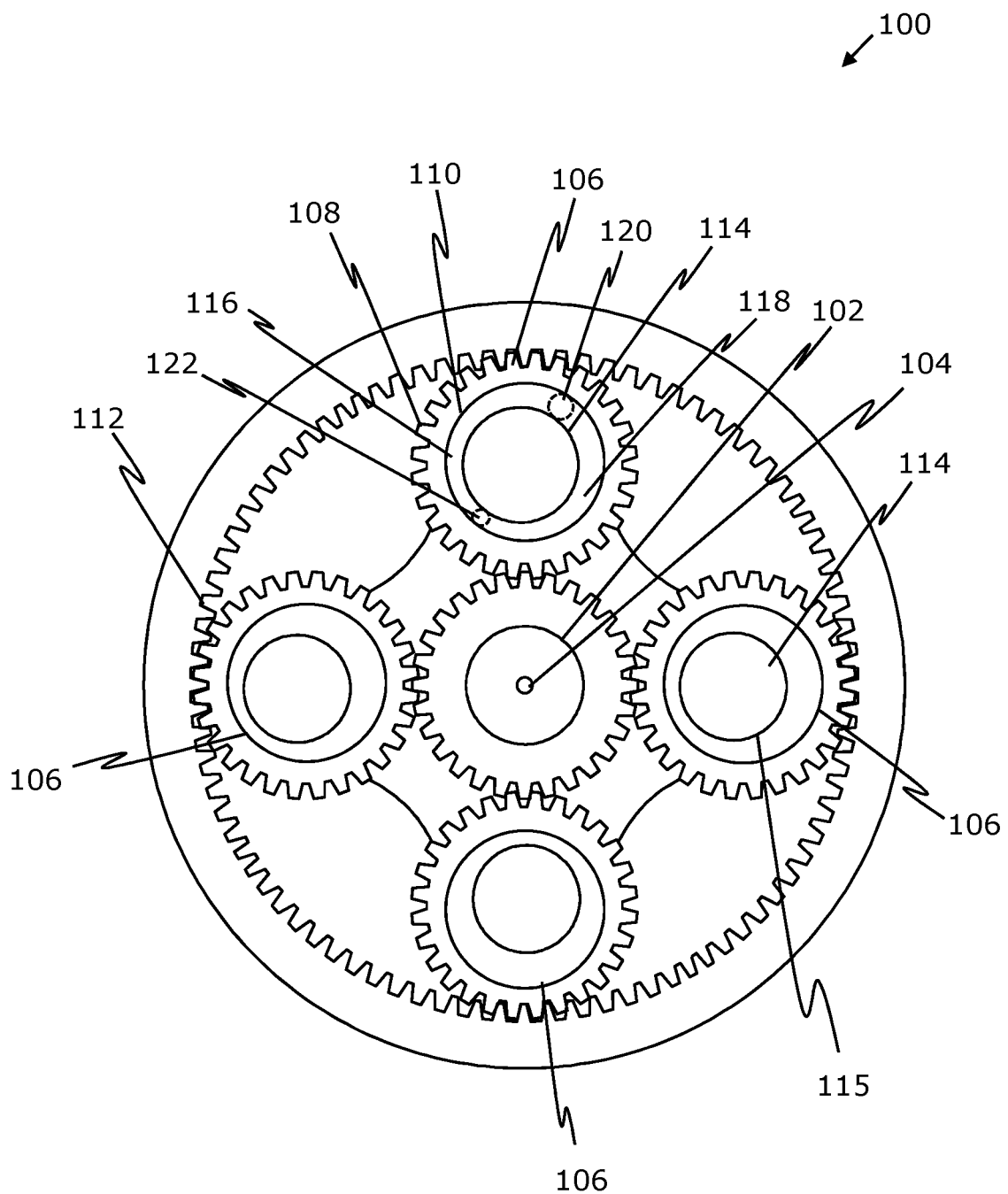
FIG. 1 is a cross-sectional view of a planetary gear arrangement, in accordance with an embodiment of the present disclosure.

FIG. 1 is a front view of a planetary gear arrangement 100, in accordance with an embodiment of the present disclosure. As shown, the planetary gear arrangement comprises a sun gear 102 configured to rotate about an axis of rotation 104 of the planetary gear arrangement and defines an axial direction of the planetary gear arrangement 100.

The planetary gear arrangement 100 further comprises a plurality of planet gears 106. Typically, the sun gear 102 drives the plurality of planet gears 106. It will be appreciated that the toothing of the sun gear 102 is in continuous engagement with the toothing of the plurality of planet gears 106. Optionally, the toothing between the plurality of planet gears 106 and the sun gear 102 may be, for example, a spur gearing, a helical gearing, and a double helical gearing. Each of the plurality of planet gears 106 is configured as a hollow cylinder and forms an outer shell surface 108 and an inner shell surface 110. Notably, the sun gear drives 102 the plurality of planet gears 106 about an axis of rotation parallel to the axis of rotation of the sun gear 102. The outer shell surface 108 of the plurality of planet gears 106 forms a toothing that is in engagement with the toothing of a ring gear 112. Optionally, the toothing between the plurality of planet gears 106 and the ring gear 112 may be a spur gear, a helical gear, or a double helical gearing. Operatively, the plurality of planet gears 106 are rotatably coupled with the sun gear 102 and revolves circumferentially along the ring gear 112.

Moreover, the inner shell surface 110 of the plurality of planet gears 106 is configured to receive the plurality of journal pins 114. In this regard, the plurality of journal pins 114 and the plurality of planet gears 106 form a lubricated journal bearing at their facing surfaces. Herein, an outer surface 115 of the journal pin 114 is in contact with the inner shell surface 110 of the plurality of planet gears 106. Notably, the plurality of journal pins 114 is arranged in the plurality of planet gears 106 forming a convergent gap 116 and a divergent gap 118. Furthermore, the plurality of journal pins 114 and the plurality of planet gears 106 forms a maximum gap 120 and a minimum gap 122 between the convergent gap 116 and the divergent gap 118. It will be appreciated that the minimum gap 122 forms at the end of convergent gap 116 and the maximum gap 120 forms at the end of the divergent gap 118.

The plurality of journal pins 114 is configured to conform to the plurality of planet gears 106 when subjected to a load and form an effective area therebetween to bear the load. Optionally, the plurality of journal pins 114 may include a crowning (not shown) on the outer surface 115. Typically, the crowning enables support for the axial load exerted on the plurality of journal pin 114. Notably, the plurality of planet gears 106 and the plurality of journal pins 114 have a different axis that yields the convergent gap 116 which extends from the maximum gap height to the minimum gap height, and the divergent gap 118 which extends from the minimum gap height to the maximum gap height.

Under operation, cold oil is drawn into the convergent gap 116 to to lubricate the journal bearing and to maintain the temperature and reduce the frictional losses. Typically, the convergent gap 116 is filled with the oil and is configured to form a thin oil film. It will be appreciated that the higher external loads will result in the higher eccentricity of the journal bearing and thereby having a smaller minimum gap height. The cold oil generally reaches the bottom minimum gap 122 where it gets hot and rotates circumferentially around the inner shell surface 110. Notably, each of journal pin has at least one longitudinal groove (not shown, shown in FIG. 3A, 3B) along the outer surface 115 thereof, and the at least one longitudinal groove is configured to guide oil on the outer surface 115 when the oil is carried from the minimum gap 122 towards the maximum gap 120 due to a rotary movement between a planet gear 106 around a corresponding journal pin 114. Optionally, the at least one longitudinal groove is operable to avoid mixing of the hot oil in the with the cold oil in the top maximum gap 120.

Figure 2:
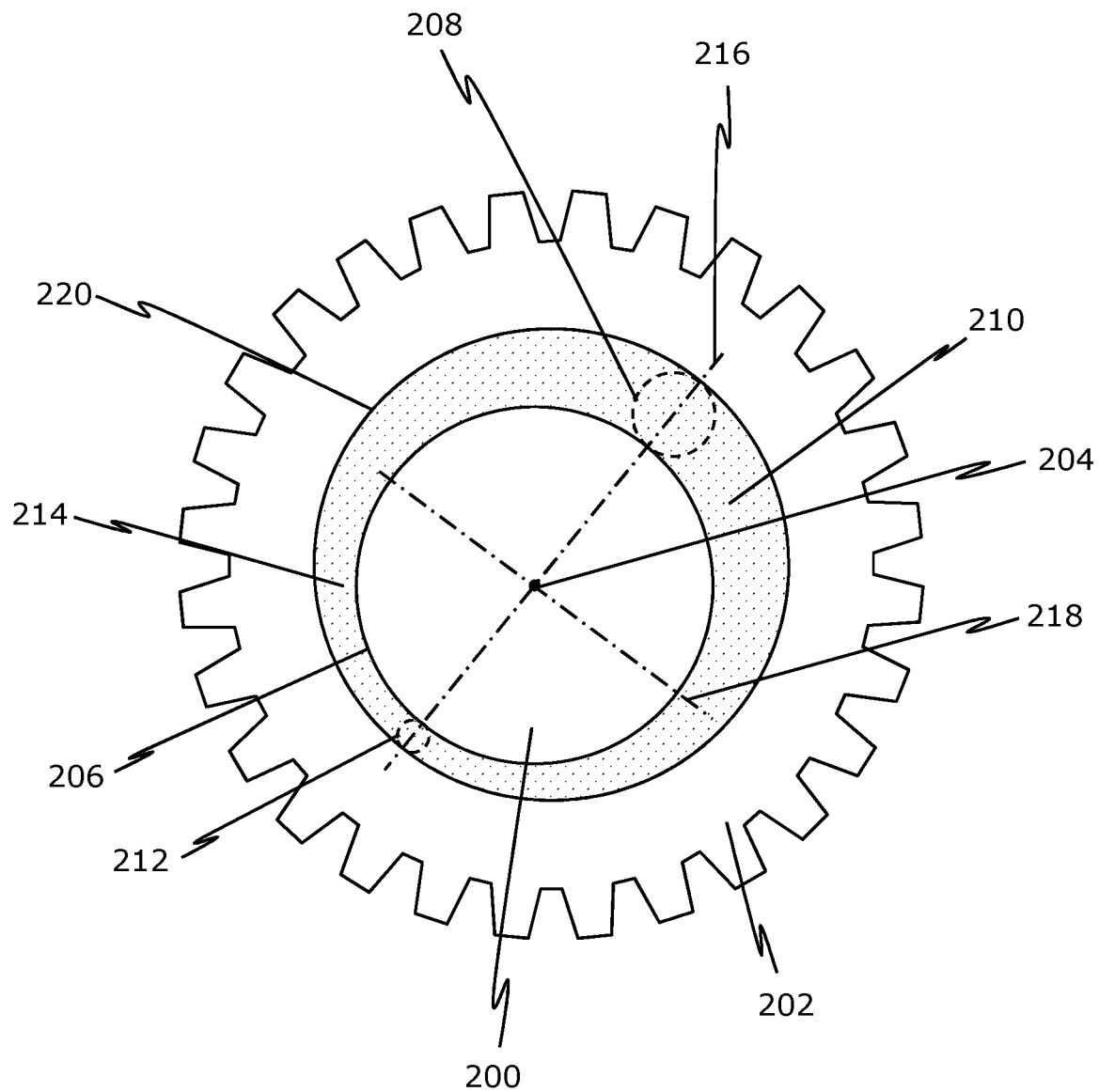
FIG. 2 is a front view of a journal pin for supporting a gear, in accordance with an embodiment of the present disclosure.

FIG. 2 is a front view of a journal pin 200 for supporting a gear 202, in accordance with an embodiment of the present disclosure. The gear 202 may be a planet gear of a planetary gear box. As shown, the journal pin 200 comprises a longitudinal axis 204 and an outer surface 206 wherein the journal pin 200 is arranged in the planet gear 202 to form a maximum gap 208 at the end of a divergent gap 210 and a minimum gap 212 at the end of a convergent gap 214 therebetween. The divergent gap 210 and the convergent gap 214 are formed between an inner surface 220 of the planet gear 202 and an outer surface 206 of the journal pin 200. The journal pin comprises at least one longitudinal groove (FIG. 3A, FIG. 3B) along the outer surface 206 thereof, and wherein the at least one longitudinal groove is configured to guide oil on the outer surface 206 when the oil is carried from the bottom minimum gap 212 towards the top maximum gap 208 due to a rotary movement between the gear 202 around the journal pin 200. To better locate the bottom minimum gap 212 and maximum gap 208 axes 216 and 218 are shown in the figure. Further, an angular co-ordinate system may be established with 0° at the maximum gap 208 and 180° at the minimum gap 212 with angle degrees increasing along the flow direction of the oil along the converging gap 214 and subsequently the diverging gap 210.

In this regard, the convergent gap 214 extends from a maximum gap height 208 to a minimum gap height, and the divergent gap 210 which extends from the minimum gap height 212 to the maximum gap height 208. Under operation, an oil is drawn into the convergent gap 214. Typically, the convergent gap 214 is filled with the oil which forms a thin oil film.

Optionally, each of the plurality of journal pins is elliptical in shape. Optionally, when the journal pin is elliptical in shape, the said plurality of journal pins have a major semi-axis and a minor semi-axis. Notably, the major semi-axis and the minor semi-axis coincide at the center of the journal pin. In addition, an oil feed coincides with the major semi-axis at the top oil feed pocket configured to provide the oil between an inner surface of the gear and the outside contact surface of the journal pin. In other words, the converging gap is formed between the gear and the top point of major semi-axis below the journal pin.

Figure 3A:
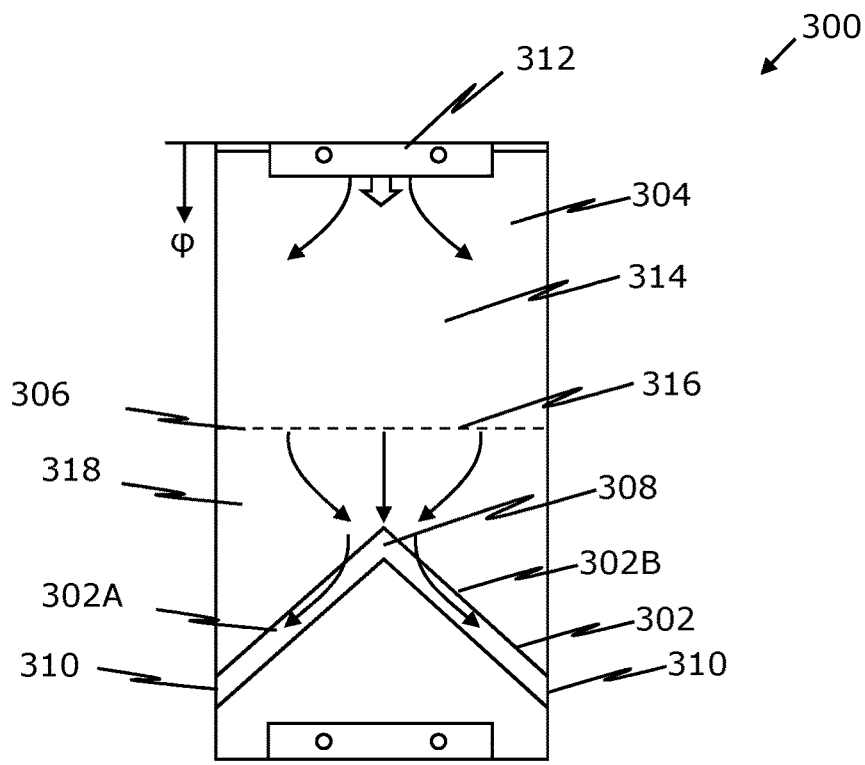
FIGS. 3A and 3B are the views of a journal pin, in accordance with the various embodiment of the present disclosure.
Figure 3B:
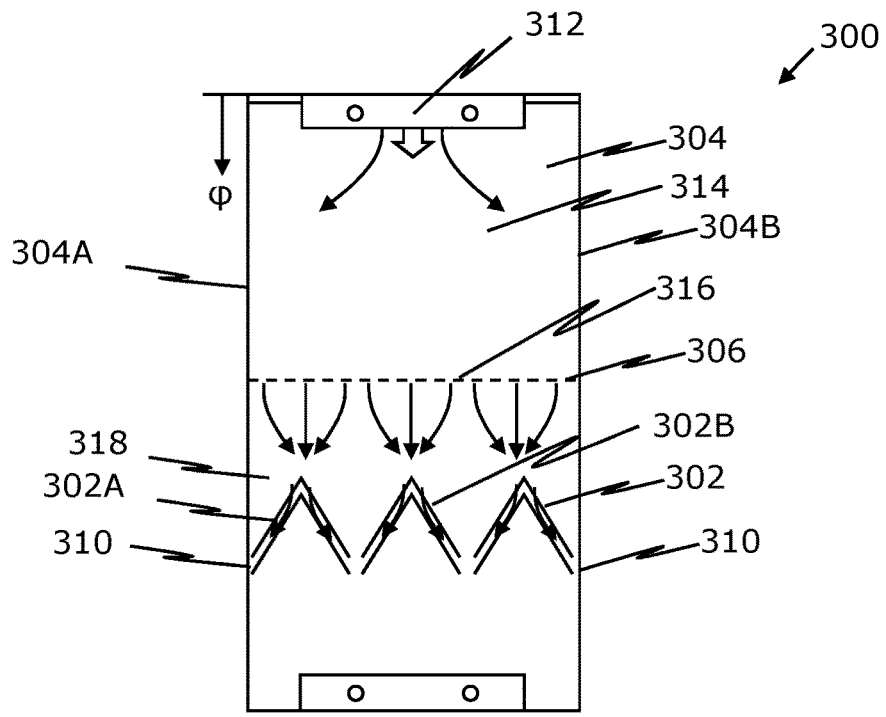

FIGS. 3A and 3B are views of the circumferential outer surface 304 of a journal pin 300, in accordance with an embodiment of the present disclosure. Letter φ indicates the direction of rotation and oil flow. As shown FIG. 3A, the at least one longitudinal groove 302 is a continuous groove running along the outer surface 304 from a proximal end 304A to a distal end 304B of the journal pin 300. The at least one longitudinal groove 302 is operable to avoid mixing of the hot oil with the cold oil. As shown FIG. 3B, the longitudinal groove 302 runs in an axially spaced apart manner along the outer surface 304 from a proximal end 304A to a distal end 304B of the journal pin 300. Optionally, the at least one longitudinal groove 302 comprises a plurality of grooves configured in sinusoidal or wave-like structure. More optionally, the at least one longitudinal groove 302 may be a single groove, continuous groove or multiple continuous grooves parallel to each other. It is appreciated that there may be several rows of longitudinal grooves 302 spaced apart around the circumference of the journal pin 300.

The longitudinal groove 302 is arranged in an angle with respect to a centerline 306 of the journal pin 300 to form a helical groove. In this regard the longitudinal groove 302 forms a proximal section 302A and a distal section 302B. Both, the proximal section 302A and the distal section 302B meet at an apex 308. In the embodiment of FIG. 3A, the apex 308 is arranged in the axial center of the journal pin 300 between both axial ends 304A, 304B. From the apex 308 the proximal section 302A and the distal section 302B are oriented in a circumferential downstream direction until the groove 302 runs out at exit openings 310 located at the proximal end 304A and distal end 304B, respectively. It is understood that the proximal section 302A is oriented circumferentially downstream from the apex 308 toward an exit opening 310 at the proximal end 304A, and the distal section 302B is oriented circumferentially downstream from the apex 308 toward an exit opening 310 at the distal end 304B.

In operation fresh cold oil is introduced into the journal bearing at the main feed 312 at the maximum gap to enter the converging gap 314. The fresh cold oil heats up significantly in the converging gap 314. After the minimum gap 316 the oil reaches its maximum temperature and is carried over into the diverging gap 318. Dependent of the operating conditions the minimum gap 316 is expected at a circular angle between 170° and 210° about the circumference, with 0° being at the main feed and 180° being at the minimal gap between the journal pin 300 and the planet gear.

The groove 302 is formed in the unloaded diverging gap 318. This means that the helical grooves 302 are formed only about a section around the circumference of the journal pin 300 while the remaining section of the journal pin remains free of grooves. Therefore, the helical grooves extend over an angular range between 170° and 270°, particular between 180° and 250°, more particular between 190° and 230° about the circumference of the journal pin.

The helical groove 302 is configured and arranged to guide the hot, used oil out of the bearing towards its axial ends 302A, 302B away from the axial center where the oil leaves the bearing through exit openings 310. Thus, the oil runs in the helical groove 302. Consequently, the hot oil is not carried over to the oil feed pocket at top dead center at the maximum gap and does not heat up the fresh cool oil introduced into the bearing. This leads to a lower temperature level in the bearing. A lower temperature in the bearing allows for fewer oil required to meet the temperature requirements but also increases the journal bearing robustness, protects the integrity of the coating and reduces the risk of thermal seizures.

Figure 4:
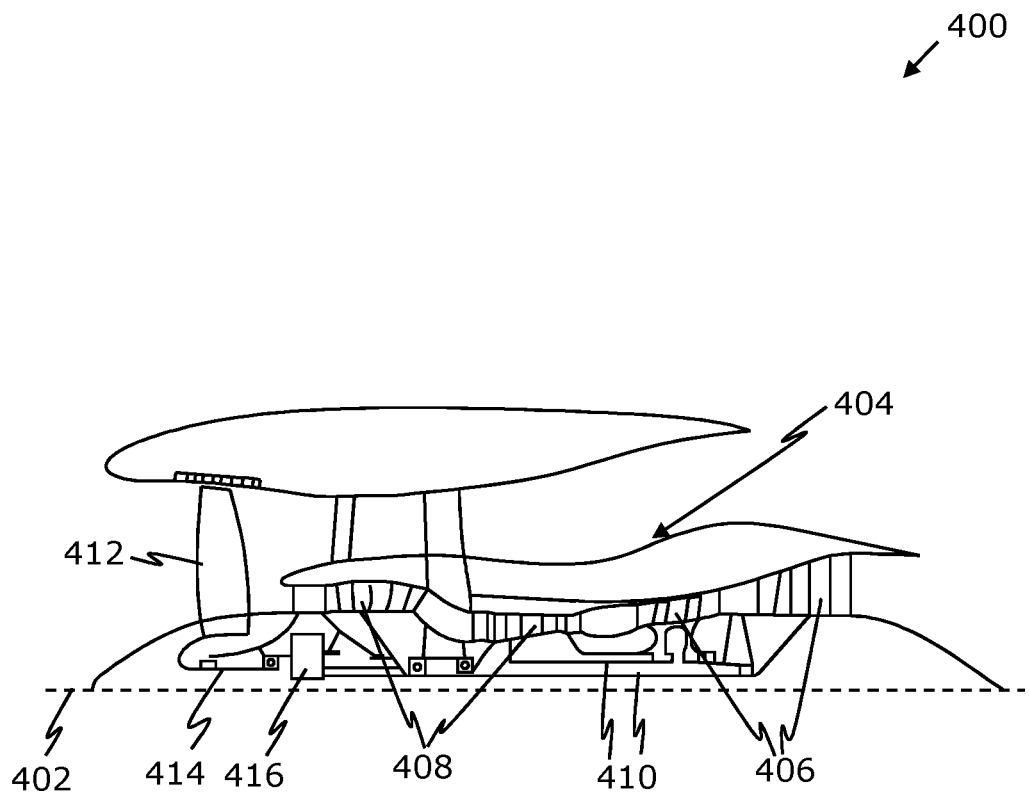
FIG. 4 is a cross-sectional view of a gas turbine engine for an aircraft, in accordance with an embodiment of the present disclosure.

FIG. 4 is a cross-sectional view of a gas turbine engine 400 for an aircraft, in accordance with an embodiment of the present disclosure. As shown the gas turbine engine 400 having a principal axis of rotation of 402. The gas turbine engine 400 comprises an engine core 404 having a turbine 406, a compressor 408 and a turbine shaft 410. Notably, the compressor 408 is configured to compress the air and the compressed air is then added with fuel to be burnt and then passed to the turbine 406 to expand the compressed hot gas. Moreover, the gas turbine engine 400 comprises a fan 412 with a plurality of fan blades.

The turbine shaft 410 connects the turbine 406 to the compressor 408. It is understood that the turbine 406 may comprise a high pressure section and a low pressure section and that the compressor may comprise a low pressure section and a high pressure section in the direction of airflow. In a multi-shaft arrangement, a high pressure section of the turbine 406 may be operatively connected to the high pressure section of the compressor by a high pressure shaft of the turbine shaft 410 and the low pressure section of the turbine 406 may be operatively connected to the low pressure section of the compressor 408 by a low pressure shaft of turbine shaft 410. The low pressure shaft of turbine shaft 410 may be also connected to a planetary gear box. The fan 412 positioned upstream of engine core 404 which have plurality of fan blades and afan shaft 414 that is connected to a planetary gear box 416 and helps in transfer of load. The planetary gear box 416 is arranged axially in front of the turbine 406 and the compressor 408. During operation, air is accelerated and passed into the compressor 408. The compressed air is ejected from the compressor 408 into the combustion device, where it is mixed with fuel and that mixture is burned. The resulting hot products of combustion spread through the turbine 406 and drive it, thereby driving the compressor 408 and fan 412 to produce thrust, before the combustion products are ejected through the nozzle. The turbine 406 and planetary gear box 416 are attached to an inner periphery of the gas turbine engine 400.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A planetary gear arrangement comprising:
a sun gear configured to rotate about an axis of rotation of the planetary gear arrangement and defining an axial direction of the planetary gear arrangement;
a plurality of planet gears driven by the sun gear;
a ring gear engaged with the plurality of planet gears; and
a plurality of journal pins, wherein the plurality of journal pins are respectively arranged in the plurality of planet gears forming a converging gap and a diverging gap therebetween, wherein each journal pin has only one longitudinal groove or a plurality of longitudinal grooves along an outer surface thereof, and wherein the only one longitudinal groove or the plurality of longitudinal grooves is configured to guide oil along the outer surface of the journal pins when the oil is carried from the converging gap towards the diverging gap due to a rotary movement between each of the planet gears around the corresponding journal pin;
wherein the only one longitudinal groove or the plurality of longitudinal grooves extends only within a circumferential range of between 170° and 270° for each journal, where 0° is set at a maximum gap between the planet gear and the journal pin.

2. The planetary gear arrangement according to claim 1, wherein each of the plurality of journal pins is elliptical in shape.

3. The planetary gear arrangement according to claim 1, wherein the only one longitudinal groove or the plurality of longitudinal grooves is each a continuous groove running along the outer surface from a proximal end to a distal end of the journal pin.

4. The planetary gear arrangement according to claim 1, wherein the only one longitudinal groove or the plurality of longitudinal grooves comprises a plurality of grooves configured in a spaced apart manner along the outer surface from a proximal end to a distal end of the journal pin.

5. The planetary gear arrangement according to claim 1, wherein the only one longitudinal groove or the plurality of longitudinal grooves is configured on a non-load bearing portion of the outer surface of the journal pin.

6. The planetary gear arrangement according to claim 1, wherein the only one longitudinal groove or the plurality of longitudinal grooves is operable to avoid mixing of hot oil with cold oil in the converging gap.

7. The planetary gear arrangement according to claim 1, wherein the only one longitudinal groove or the plurality of longitudinal grooves extends only within a circumferential range of between 180° and 250° for each journal.

8. The planetary gear arrangement according to claim 1, wherein the only one longitudinal groove or the plurality of longitudinal grooves extends only within a circumferential range of between 190° and 230° for each journal.

9. A journal pin for supporting a gear, the journal pin comprising:
a longitudinal axis and
an outer surface,
wherein the journal pin is arranged in the gear forming a converging gap and a diverging gap therebetween, wherein the journal pin has only one longitudinal groove or the plurality of longitudinal grooves along the outer surface thereof, and wherein the only one longitudinal groove or the plurality of longitudinal grooves is configured to guide oil along the outer surface when the oil is carried from the converging gap towards the diverging gap due to a rotary movement between the gear around the journal pin;
wherein the only one longitudinal groove or the plurality of longitudinal grooves extends only within a circumferential range of between 170° and 270° for the journal pin, where 0° is set at a position of a maximum gap between the gear and the journal pin.

10. The journal pin according to claim 9, wherein the only one longitudinal groove or the plurality of longitudinal grooves is a continuous groove running along the outer surface from a proximal end to a distal end of the journal pin.

11. The journal pin according to claim 9, wherein the only one longitudinal groove or the plurality of longitudinal grooves comprises a plurality of grooves configured in a spaced apart manner along the outer surface from a proximal end to a distal end of the journal pin.

12. The journal pin according to claim 9, wherein the at least one longitudinal groove is configured on a non-load bearing portion of the outer surface of the journal pin.

13. The journal pin according to claim 9, wherein the only one longitudinal groove or the plurality of longitudinal grooves is operable to avoid mixing of hot oil with cold oil in the converging gap.

14. The journal pin according to claim 9, wherein the only one longitudinal groove or the plurality of longitudinal grooves is configured and arranged to guide the oil from an axial center of the journal pin towards axial ends of the journal pin.

15. The journal pin according to claim 14, wherein the only one longitudinal groove or the plurality of longitudinal grooves comprises an apex at the axial center of the journal pin, a proximal section and a distal section, wherein the proximal section and the distal section are oriented from the apex in a circumferential downstream direction toward one of the axial ends of the journal pin.

16. The journal pin according to claim 9, wherein the only one longitudinal groove or the plurality of longitudinal grooves comprises respective exit openings at respective axial ends thereof.

17. The journal pin of claim 9, wherein a remaining part of the journal pin is free of grooves.

18. The journal pin according to claim 9, wherein the gear is a planet gear of a planetary gear box.

19. The journal pin according to claim 9, wherein the only one longitudinal groove or the plurality of longitudinal grooves extends only within a circumferential range of between 180° and 250° for each journal.

20. A gas turbine engine for an aircraft, comprising:
an engine core having a turbine, a compressor and a turbine shaft connecting the turbine to the compressor;
a fan positioned upstream of the engine core, the fan having a plurality of fan blades and a fan shaft; and
a planetary gear box including the journal pin according to claim 9 for receiving input from the turbine shaft and providing output to the fan shaft.

\* \* \* \* \*